UNITED STATES PATENT OFFICE.

CHARLES H. KOYL, OF BALTIMORE, MARYLAND, ASSIGNOR TO THE AMERICAN ELECTROPHORE COMPANY, OF WASHINGTON, D. C.

MANUFACTURE OF POROUS CARBON PLATES.

SPECIFICATION forming part of Letters Patent No. 279,400, dated June 12, 1883.

Application filed March 27, 1883. (No specimens.)

*To all whom it may concern:*

Be it known that I, CHARLES H. KOYL, of Baltimore, in the State of Maryland, have invented certain new and useful Improvements in the Manufacture of Porous Carbon Plates for Electrical and other Uses, of which the following is a specification.

In these improvements I have had mainly in view the production of porous carbon plates for secondary batteries; but the process I have devised is applicable also to the manufacture of porous carbon plates for any purpose.

The object of my improvements is to prevent the plates from adhering to the walls of the mold, to prevent them from warping or breaking, and to permit them to be readily removed from the mold and separated from one another after the carbonizing operation.

I carbonize my plate in a mold or holder whose walls are formed or lined with wood, preferably soft wood, or an equivalent material—such as card-board or paper—which will carbonize at the heat to which the hydrocarbon material from which the plate is made is subjected during the carbonizing or baking operation, and will under these conditions be converted into a soft form of carbon or charcoal, which can subsequently be readily separated and removed from the carbon plate. Thus the plate is held in shape during the carbonizing operation by walls made of a carbonizable substance, which, after carbonization, can readily be removed from the plate. In the mold one of the faces or edges of the plate is exposed, and I cover this face by sand or equivalent permeable material applied directly to the material in the mold. This feature is one of material value. The sand apparently permits the free escape from the hydrocarbon material of gases which may be generated therein by and during the carbonizing operation, and thus prevents the material from becoming misplaced or thrown out of shape, as it would be otherwise. At any rate, whatever may be the explanation, the fact is that by the use of a sand cover applied directly to the material in the mold the plate retains its shape and comes out in perfect condition, whereas if the hydrocarbon material be first covered by a solid or continuous plate or sheet of wood, paper, or other material, (which, of course, is in turn covered by sand,) the plate comes out distorted, damaged, and practically unfit for use.

In carrying out my invention I proceed preferably as follows: In making a number of plates at one time I have a mold-box made of soft wood, and of proper size and shape—say about a foot square—with an open top. The interior of the box is divided up, by means of partitions of soft wood, paper, card-board, or the like, into receptacles of the size and dimensions required for the plates.

The material from which I make the carbon plates is a hydrocarbon or a mixture of hydrocarbons and preferably coal-tar, such as obtained from gas-works. This coal-tar I previously heat, so as to drive off from it its more volatile constituents. The extent to which this preliminary evaporating step is carried will determine the porosity of the plate. The less evaporation the greater will be the porosity. The coal-tar or other hydrocarbon, in fluid or semi-fluid condition, is poured into the several receptacles in the mold-box, so as to fill them nearly, if not entirely. The box is then put into an iron box or form which is of sufficiently greater size than the wooden box to leave a space of three, four, or more inches between the walls of the two. A layer of sand is put upon the bottom of the iron box before the wooden box is put therein, and after the box is in place sand is filled in around its sides and over its top to a depth of three or four inches, thus covering the exposed edges of the plates with sand, which is in direct contact therewith. The iron cover of the inclosing iron box is then put on, and the joints are luted, as usual, after which the iron box, with its contents, is put into the carbonizing furnace, and heat is applied and maintained in the customary and well-known way until the plates are thoroughly baked or carbonized. The metal box is then taken out, the wooden mold will be found converted into charcoal, the carbon plates are removed, and are divided from one another by a knife or other tool which easily passes down through the charcoal or soft carbon of the partitions. This charcoal or carbon is scraped, by a wire brush or other suitable means, from the plates. Their edges which were in contact with the sand during the carbonizing operation are also scraped or ground off, so as to remove the sand, and the plates are then complete. They will be found to be porous, and to retain perfectly the shape of the mold without warping, twisting, or fracture.

I can, if desired, produce a porous carbon block in accordance with the same process of manufacture described above, and subsequently divide this block by a saw into plates of the desired dimensions; but I prefer the method of manufacture first above described. In both cases, however, it will be seen that the material is carbonized without pressure, is held in a mold made of soft wood or equivalent carbonizable material, and is provided on its exposed edge or face with a sand cover directly applied thereto.

I am aware that in the manufacture of carbon filaments designed more particularly for use in incandescing electric lamps, blanks of a carbonizable material have been carbonized between sheets of card-board or the like whose rate of expansion and contraction is about the same as their own; but this I do not claim.

Having described my improvements, what I claim as new and of my invention is—

1. The improvement in the art of making porous carbon plates for secondary batteries and other purposes, consisting in placing the material from which the plate is to be made in a mold or receptacle of wood or its specified equivalent, then subjecting the same to carbonizing-heat, whereby both the plate and its inclosing-mold will be carbonized, and subsequently separating the two, substantially as hereinbefore set forth.

2. The improvement in the art of making porous carbon plates, consisting in carbonizing the material from which said plate is formed in a mold of wood or its specified equivalent, and covering the exposed face or edge of said material in the mold during the carbonizing operation with sand applied directly thereto, substantially as hereinbefore set forth.

In testimony whereof I have hereunto set my hand this 24th day of March, 1883.

CHARLES H. KOYL.

Witnesses:
   E. A. DICK,
   J. WALTER BLANDFORD.